Nov. 14, 1933.   L. S. ADAMS   1,935,283
SHOCK ABSORBING DEVICE FOR AIRPLANE PACKAGE TRANSFER APPARATUS
Filed July 14, 1931
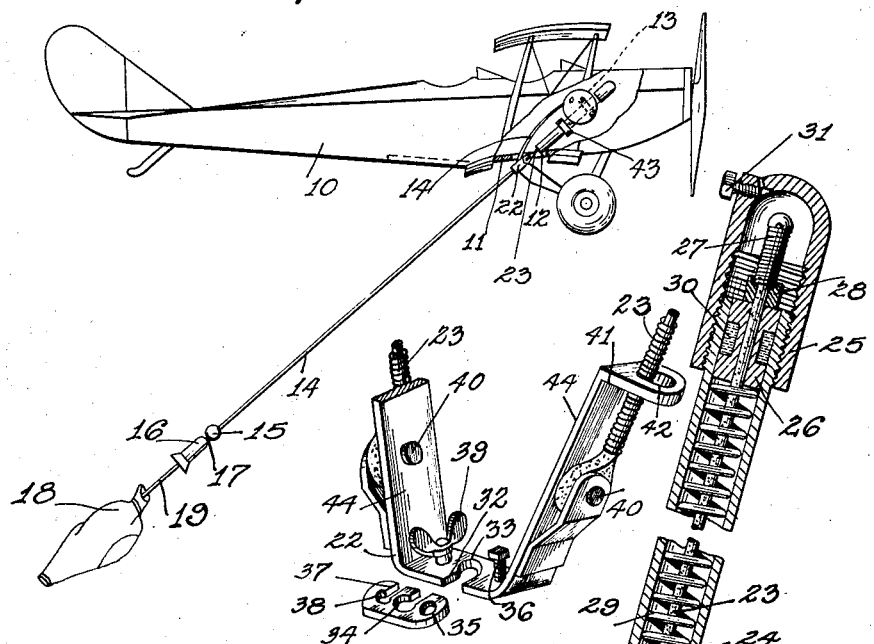
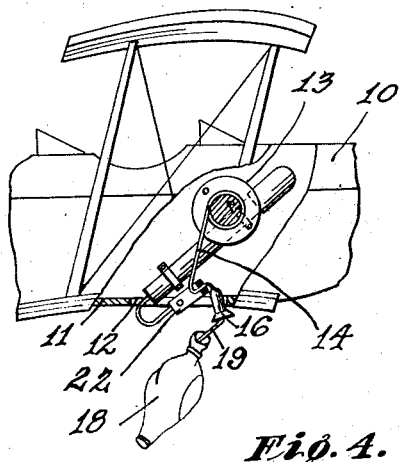
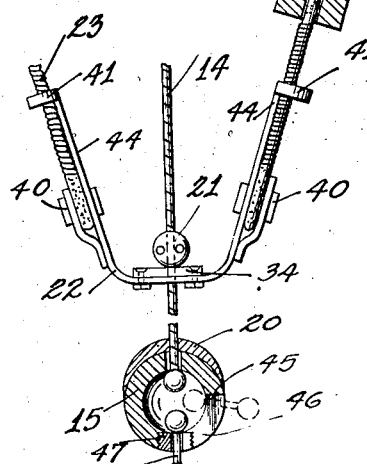
Inventor
Lytle S. Adams
By Emery, Booth, Varney & Holcombe
his Attorneys Patented Nov. 14, 1933

1,935,283

UNITED STATES PATENT OFFICE 1,935,283

SHOCK ABSORBING DEVICE FOR AIRPLANE PACKAGE TRANSFER APPARATUS

Lytle S. Adams, Washington, D. C.

Application July 14, 1931. Serial No. 550,801

14 Claims. (Cl. 258—1)

This invention relates to improvements in shock absorbing means for use on airplanes to cushion the sudden pull on the pickup cable or grappling line, when dropping or engaging a load, and prevent the shock from breaking the cable or damaging the airplane, or reel, or other part of the apparatus.

In my prior applications, Ser. No. 279,320, filed May 21, 1928, now Patent No. 1,758,880, dated May 13, 1930, Ser. No. 305,970, filed September 14, 1928, now Patent No. 1,818,835, dated Aug. 11, 1931, and Ser. No. 401,535, filed October 22, 1929, now Patent No. 1,825,329, dated Sept. 29, 1931, I have shown devices which make it possible for a moving airplane to pick up a package or load from the ground by means of a trailing grappling line or cable suspended from a reel on the airplane, and for absorbing the shock which occurs when the cable picks up a load before it is transmitted to the airplane fuselage. This improvement comprises means for cushioning and frictionally absorbing the sudden pull which may amount to a substantial shock when the cable picks up the load, and for absorbing the recoil to prevent the cable or load from being whipped upwardly and fouling or damaging the airplane fuselage or wing structure.

This invention aims to provide compact, self-contained cushioning and shock absorbing means to prevent overstraining of the apparatus or recoil and whipping of the cable and load, and to control the length of the cable paid out to insure accuracy in determining the height of the grapple above the point of contact with the ground apparatus.

This invention also aims to provide suitable means operated automatically by hand or power to permit the rapid extension of the shock cord, when the compression spring is collapsed and the shock cord has protruded its length from the housing, and to reel in the cable and load.

Further aims and advantages appear in connection with the following description of the illustrative embodiment of the invention shown in the accompanying drawing, wherein Fig. 1 is a side elevation of an airplane in flight, showing the trailing grappling line or cable extended ready to discharge and pick up a load, the side of the fuselage being broken away to show the shock absorbing devices attached to the side of the cockpit or cabin.

Fig. 2 is a detail side view of portions of the trailing grappling line or cable showing a form of grapple and a suitable connection for engaging a shock cord, one shock cord and its housing being shown in section.

Fig. 3 is a detail perspective view of a shock cord yoke connection.

Fig. 4 is a fragmentary detail of the side of the airplane, similar to Fig. 1, showing the shock absorber device and the yoke and load drawn up into the flooring of the fuselage.

Referring to the drawing, the airplane 10 is fitted with an opening or hatchway 11 in the floor of the cockpit or cabin closed by upwardly opening doors, not shown, adjacent to which is mounted a reel 13 for paying out and winding up the grappling line or cable 14 which is fitted with the anchor ball 15 or other grappling device and is suspended below the airplane through suitably located openings 12 in the doors.

In the form of grapple illustrated the anchor ball is connected to a socket or cup member 16 by means of frangible connection 17 (see Fig. 2). The load 18 may be detachably secured to the socket member 16 of the grappling device by means of an elastic cord 19 or other resilient means to reduce the shock upon the cable when it strikes the ground or ground apparatus at the moment of being detached. This elastic cord also absorbs some of the shock due to picking up a stationary load by the moving grappling device, and the ball is fitted with a rubber washer 20 to assist in cushioning the shock of picking up the load.

In the operation of an airplane provided with my improved pickup device, the pilot flies at a fixed altitude above the ground station, which may be seventy-five feet or whatever distance above the field the usual beacons are located, and lets out sufficient cable, say one hundred and fifty feet, to suspend the load at the right height above the ground for engagement with the ground trap at the speed at which he is flying.

To assist the pilot in controlling the amount of cable let out, a ball or other fixed object 21 is clamped to the cable—say one hundred and fifty feet from the grapple end, and adapted to engage a yoke 22 held by two shock cords 23, commonly made of rubber strands, secured at their upper ends to the friction shock absorbers 24, which may be clamped to the reel support or any convenient part of the body structure. Each friction shock absorber comprises a barrel closed at its upper end by a cap 25 and containing a piston 26 to which the shock cord 23 is attached as by being extended through it and knotted on its end, the knotted end 27 being seated on a rubber washer 28 to close the hole in the piston. A spring 29 is arranged between the piston 26 and the lower end of the barrel. Oil packing 30 may be provided for the piston. The cap 25 is provided with a bleed vent 31 for adjusting the anti-recoil effect due to the return of the spring 29.

The yoke 22 has an opening which embraces the cable, but the opening is too small to pass the ball 21, so that when the latter strikes the yoke as the cable is paid out through it, the cable is arrested, the weight of the load 18 being taken by the shock cord 23 and spring 29. Upon dropping the load, the shock due to the load engaging the detaching means is absorbed by the cords 23 and compression springs 29, which move freely downwards in the housings 24. The lower end of each housing 24 serves as a loose guide for the shock cord and the housings practically cover the shock cords when in normal position and protect them from injury. The piston 26 and bleed valve 31 serve to regulate the speed of recoil and prevent the grappling device 15 from whipping up into the plane when the load is dropped.

The yoke 22 may advantageously comprise a double armed body having a slot 32 leading from one edge into the center hole 33 for the cable. This slot is closed by a cover plate 34 to prevent the cable from whipping out. The cover plate is pivoted at 35 and held in place by a screw 36. Located at the other end of the cover plate is a groove 37 leading to the hole 38 to allow the cover plate to swing back to permit the removal of the line or cable 14, and this end is normally secured by a thumb screw 39. The shock cords 23 are attached to the yoke 22 by eyes and pins 40, each shock cord passing through a flange 41 on the extension arm 44 of the yoke having an aperture 42 which acts as a stabilizer and prevents the shock cord from whipping out.

The line or cable 14 is wound upon the reel 13 as disclosed more fully in my previous application now Patent No. 1,825,329. Each housing 24 is adjustably attached to the side of the cockpit or cabin by a clamp 43.

The anchor ball in the form illustrated is hollow and the frangible connectors 17 may be slipped into the hollow ball through an orifice 45 at one side, and connected with the axial passage in the nut 47 by a slot 46, as shown in Fig. 2. By turning the slotted nut 47 this slot 46 may be closed to secure the frangible connector in place.

In operating the device the operator opens the trap doors (not shown) and drops the anchor ball, and attached cup and package, controlling its speed of descent by the hand brake on the reel, not shown. The automatic brake, also not shown, comes into action to slow down the reel when the cable is paid out to the desired distance so that the ball 21 engages the yoke 22, which transfers the weight of the trailing load to the shock cords 23 as shown in Fig. 1.

The trailing load moves horizontally through the air with the plane, which is flown at the proper altitude by reference to the field beacons, until it enters the trap and is brought to rest, thereby parting the frangible connectors 17, and the anchor ball picks up the waiting carrier, all shocks during this exchange being absorbed by the shock cords 19, rubber washer 20, shock cords 23, and springs 29. Should the load become detached after stretching out the shock cords 23, the pistons 26 and compression of the air within the caps 25 will prevent sudden return movement of the springs 29 and will check the recoil of the cable and ball and prevent possible damage to the airplane.

The advantages of this improvement are obvious, and greatly prolong the serviceable life of the apparatus.

The invention is not restricted to the details of the apparatus shown and described, which constitute a preferred embodiment of my invention, but what I claim and desire to protect by Letters Patent is as follows:

1. The combination with an airplane of a grappling line, shock absorbing means comprising an elastic cord connecting the grappling line with the airplane, spring means supporting said cord, and means for withdrawing said line into said airplane.

2. The combination with an airplane of a grappling line, shock absorbing means comprising a housing and an elastic cord normally encased therein connecting the grappling line with the airplane, spring means supporting said cord within said housing, and means for withdrawing said line into said airplane.

3. The combination with an airplane of a grappling line, shock absorbing means comprising a housing and an elastic cord normally encased therein connecting the grappling line with the airplane, guiding means on said shock absorbing means to prevent entangling of the shock cord with the housing, and spring means supporting said cord within said housing.

4. The combination with an airplane, of a winding drum mounted thereon, a grappling line wound upon said drum, and elastic stop means actuated by the paying out of part of said line for retarding the further unwinding of said drum, said elastic stop means comprising a compression spring and a housing for said spring.

5. In combination with an airplane and a winding reel mounted thereon, a grappling line wound on said reel and adapted to be let out to trail below said airplane, a rope guiding yoke, shock cords attached to said airplane at one end and at the other end secured to said yoke, and stabilizing means to prevent the entangling of the shock cord with the yoke.

6. In an airplane pickup apparatus including a pick-up cable, means thereon for transferring articles therewith, resilient means for cushioning the shock which occurs when the cable picks up a load, said shock cushioning means comprising an elastic cord and spring supporting means therefor, said spring being enclosed in a housing which also serves as a protection for the shock cord when unextended.

7. In an airplane pickup apparatus including a pick-up cable, a grapple suspended at the end of said cable, elastic cord means for connecting said cable to the airplane, and resilient means associated with said cord for cushioning the shock which occurs when the grapple picks up the load, said resilient means comprising a housing enclosing a piston and a compression spring, and means for lubricating the inner walls of said housing.

8. In an airplane pickup apparatus including a trailing cable, a grapple suspended at the end of said cable, elastic cord means for connecting said cable to the airplane, and resilient means associated with said cord for cushioning the shock which occurs when the grapple picks up the load, said resilient means comprising a housing enclosing a piston and a compression spring, and means for trapping air in said housing to prevent recoil of said piston.

9. In an airplane pickup apparatus including a pick-up cable, a housing including resilient means for cushioning the shock which occurs when the cable picks up the load, and means for preventing excessive recoil of the cable when the load is dropped, said recoil preventing means comprising a piston mounted for reciprocating movement in said housing, and an air bleed orifice in said housing.

10. An airplane pickup apparatus comprising a winding reel mounted in the fuselage, a hatchway in said fuselage, a trailing cable and grapple suspended therefrom through the hatchway in the fuselage, and a load attaching device secured to the free end of said cable, in combination with a housing including resilient means for supporting said trailing cable and grapple at a predetermined distance below said hatchway, said resilient means having an anti-recoil device for preventing said cable and grapple from being thrown back against the airplane upon sudden diminution of the load, said anti-recoil device comprising spring supporting means and a piston damping device enclosed in said housing which serves as a partial protection for the shock cord.

11. Means for cushioning the shock upon the trailing grappling line of an airplane pickup apparatus comprising a pair of shock cords, a supporting yoke pivotally and detachably engaging said line and having its arms provided with stabilizing means for the shock cords, resilient means for supporting the shock cords, and an enclosing housing for said resilient means attached to the airplane, said resilient means being freely extensible but resisting return to normal position.

12. Means for cushioning the shock upon the trailing grappling line of an airplane pickup apparatus comprising a supporting yoke having resilient means suspending it from the airplane and detachably and pivotally engaging said line, and means adjustably secured upon said line for engaging said yoke, said yoke having stabilizing means to prevent the entangling of the suspension means with the yoke apparatus, whereby said line may be freely and resiliently suspended from said airplane.

13. In an airplane pickup device, cushioning means comprising a housing, a spring supported cord enclosed therein a plunger slidably mounted in said housing and secured to said cord, said plunger having means for lubricating the inner wall of the housing, and means for trapping air in said housing to resist movement of said plunger.

14. An airplane pickup device comprising a winding reel mounted in the airplane and trailing cable suspended therefrom provided with a grapple at its lower end, guiding means for said cable depending from the airplane and adapted to engage said cable to limit its lowering movement, an elastic cord attached to said guide means for relieving the shock of picking up the load, a housing mounted on said airplane normally enclosing said cord, and a spring for supporting the upper end of said cord within said housing.

LYTLE S. ADAMS.